US011700617B2

(12) United States Patent
Zhang et al.

(10) Patent No.: US 11,700,617 B2
(45) Date of Patent: *Jul. 11, 2023

(54) COMMUNICATION METHOD, APPARATUS, AND SYSTEM

(71) Applicant: HUAWEI TECHNOLOGIES CO., LTD., Guangdong (CN)

(72) Inventors: Xu Zhang, Beijing (CN); Jianguo Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 53 days.

This patent is subject to a terminal disclaimer.

(21) Appl. No.: 17/352,916

(22) Filed: Jun. 21, 2021

(65) Prior Publication Data

US 2021/0314928 A1 Oct. 7, 2021

Related U.S. Application Data

(63) Continuation of application No. 16/992,981, filed on Aug. 13, 2020, now Pat. No. 11,057,878, which is a
(Continued)

(30) Foreign Application Priority Data

Feb. 13, 2018 (CN) .......................... 201810150873.9

(51) Int. Cl.
*H04W 72/04* (2023.01)
*H04W 72/23* (2023.01)
(Continued)

(52) U.S. Cl.
CPC ........... *H04W 72/23* (2023.01); *H04L 1/0061* (2013.01); *H04L 5/0048* (2013.01); *H04W 48/12* (2013.01)

(58) Field of Classification Search
CPC .. H04W 72/042; H04W 48/12; H04L 5/0053; H04L 5/0048; H04L 1/0061; H04L 1/1819

See application file for complete search history.

(56) References Cited

U.S. PATENT DOCUMENTS

2017/0105166 A1 4/2017 Lee et al.
2017/0295552 A1 10/2017 Patel et al.
(Continued)

FOREIGN PATENT DOCUMENTS

CN 106465066 A 2/2017
CN 107623936 A 1/2018
(Continued)

OTHER PUBLICATIONS

Office action issued in Chinese Application No. 201810150873.9 dated Jul. 20, 2022, 7 pages.
(Continued)

*Primary Examiner* — Chi Ho A Lee
*Assistant Examiner* — Andrew Lee
(74) *Attorney, Agent, or Firm* — Fish & Richardson P.C.

(57) ABSTRACT

This application relates to the field of wireless communications, and in particular, to a communication method, an apparatus, and a system in a wireless communications system. In the method, a terminal device detects a physical downlink control channel PDCCH sent by a network device, the PDCCH carries indication information, and the indication information is used to indicate a type of system information; the terminal device determines, based on the indication information, a physical resource carrying the system information; and the terminal device receives the system information on the physical resource. Based on this method, a network device can flexibly indicate a type of system information that needs to be sent.

24 Claims, 4 Drawing Sheets

Related U.S. Application Data continuation of application No. PCT/CN2019/073353, filed on Jan. 28, 2019.

(51) Int. Cl.
  *H04L 1/00* (2006.01)
  *H04L 5/00* (2006.01)
  *H04W 48/12* (2009.01)

(56) References Cited

U.S. PATENT DOCUMENTS

| | | | |
|---|---|---|---|
| 2018/0255529 A1 | 9/2018 | Yu et al. | |
| 2018/0270855 A1 | 9/2018 | Loehr et al. | |
| 2019/0082431 A1 | 3/2019 | Yi et al. | |
| 2019/0158326 A1* | 5/2019 | Liao | H04L 27/14 |
| 2019/0174466 A1 | 6/2019 | Zhang et al. | |
| 2019/0200326 A1* | 6/2019 | Shin | H04L 5/005 |
| 2019/0215101 A1 | 7/2019 | Ko et al. | |
| 2019/0222357 A1* | 7/2019 | Huang | H04L 5/0094 |
| 2019/0372719 A1 | 12/2019 | Talarico et al. | |
| 2020/0120634 A1 | 4/2020 | Lee et al. | |
| 2020/0137669 A1 | 4/2020 | Lee et al. | |
| 2020/0221435 A1* | 7/2020 | Kim | H04L 5/0048 |
| 2021/0127358 A1* | 4/2021 | Li | H04J 11/0069 |

FOREIGN PATENT DOCUMENTS

| | | |
|---|---|---|
| WO | 2017119838 | 7/2017 |
| WO | 2018010661 | 1/2018 |
| WO | 2018022573 | 2/2018 |

OTHER PUBLICATIONS

3GPP TS 38.211 V15.0.0 (Dec. 2017),3rd Generation Partnership Project,Technical Specification Group Radio Access Network,NR,Physical channels and modulation(Release 15), 73 pages.
3GPP TS 38.212 V15.0 0 (Dec. 2017),3rd Generation Partnership Project,Technical Specification Group Radio Access Network,NR,Multiplexing and channel coding(Release 15), 82 pages.
3GPP TS 38.213 V15.0 0 (Dec. 2017),3rd Generation Partnership Project,Technical Specification Group Radio Access Network,NR,Physical layer procedures for control(Release 15), 56 pages.
3GPP TS 38.214 V15.0.0 (Dec. 2017),3rd Generation Partnership Project,Technical Specification Group Radio Access Network,NR,Physical layer procedures for data (Release 15), 71 pages.
3GPP TS 38.331 V15.0 0 (Dec. 2017),3rd Generation Partnership Project,Technical Specification Group Radio Access Network, NR,Radio Resource Control (RRC) protocol specification(Release 15), 188 pages.
CATT, "Summary of Offline Discussion on Remaining Minimum System Information," 3GPP TSG RAN WG1 Meeting 91, R1-171605, Revision of R1-1721554, Reno, USA, Nov. 27-Dec. 1, 2017, 27 pages.
Ericsson, "On other system information delivery," 3GPP TSG RAN WG1 Meeting #92bis, R1-1805218, Sanya, China, Apr. 16-20, 2018, 2 pages.
Extended European Search Report issued in European Application No. 19754693.0 dated Mar. 1, 2021, 11 pages.
Huawei, "[Draft] Agreements on Paging", 3GPP TSG RAN WG1 Meeting AH 1801, R1-1801284, Vancouver, Canada, Jan. 22-26, 2018, 1 page.
PCT International Search Report and Written Opinion in International Application No. PCT/CN2019/073,353, dated Mar. 29, 2019, 17 pages (with English Translation).
RAN WG1, "Agreements of Paging", 3GPP TSG RAN WG1 Meeting AH 1801, R1-1801280, Vancouver, Canada, Jan. 22-26, 2018, 1 page.
Vivo, "Remain details on other system information delivery," 3GPP TSG RAN WG1 Meeting #91, R1-1719761, Reno, USA, Nov. 27-Dec. 1, 2017, 3 pages.

* cited by examiner

COMMUNICATION METHOD, APPARATUS, AND SYSTEM

CROSS-REFERENCE TO RELATED APPLICATIONS

This application is a continuation of U.S. patent application Ser. No. 16/992,981, filed on Aug. 13, 2020, which is a continuation of International Application No. PCT/CN2019/073353, filed on Jan. 28, 2019, The international Application claims priority to Chinese Patent Application No. 201810150873.9, filed on Feb. 13, 2018. All of the aforementioned patent applications are hereby incorporated by reference in their entireties.

TECHNICAL FIELD

The application relates to the field of wireless communications, and in particular, to a communication method, an apparatus, and a system in a wireless communications system.

BACKGROUND

In a new radio (New Radio, NR) system, or in a 5th generation radio access (5G) system, a network device sends common information or specific information to a terminal device through a physical downlink shared channel (PDSCH), and instructs, by using downlink control information (DCI) carried on a control channel, the terminal device to demodulate and receive the PDSCH. The common information includes system information, and the system information is used to configure a frequency domain reference point of an access bandwidth, a random access resource, and/or an uplink/downlink resource, and the like. The system information may include a plurality of types of information, for example, remaining minimum system information (Remaining minimum system information, RMSI) (or a system information type1 (system information block type1, SIB1)) and other system information (Other system information, OSI). The system information is applied to all terminal devices accessing corresponding cells.

On a premise that there are a plurality of types of system information, how to flexibly indicate a type of system information that needs to be sent, to implement, by using fewer resource overheads, that the terminal device can correctly receive the system information of the type on a physical resource carrying the system information is a technical problem that urgently needs to be resolved.

SUMMARY

The application relates to a communication method, an apparatus, and a system, to flexibly indicate a type of system information that needs to be sent.

According to a first aspect, an embodiment of this application provides a communication method, and the method includes:

sending, by a network device, a physical downlink control channel PDCCH carrying downlink control information, where the PDCCH carries indication information, and the indication information is used to indicate a type of system information; determining, by the network device, based on the type of the system information, a physical resource carrying the system information; and sending the system information by using the physical resource; and detecting, by a terminal device, a physical downlink control channel PDCCH carrying downlink control information, where the PDCCH carries indication information, and the indication information is used to indicate a type of system information; determining; based on the indication information, a physical resource carrying the system information; and receiving, by the terminal device, the system information on the physical resource.

A cyclic redundancy code CRC included in the PDCCH is scrambled by a radio network temporary identifier RNTI.

In this manner, the type of the system information that needs to be sent can be flexibly indicated, and by using fewer resource overheads, the terminal device can correctly receive the system information of the type on the physical resource carrying the system information.

In an optional design, the indication information is a value of the RNTI.

The value of the RNTI is a first radio network temporary identifier RNTI, and the downlink control information is used to indicate first-type system information; and/or the value of the RNTI is a second radio network temporary identifier RNTI, and the downlink control information is used to indicate second-type system information.

In this method, different system information types may be determined by using different values of the RNTI, and the type of the system information that needs to be sent is flexibly indicated without increasing resource and signaling overheads.

In an optional design, the indication information is format indication information, and the format indication information is carried in the downlink control information.

In this method, an existing field or information bit is reused to indicate the type of the system information, thereby improving efficiency of indicating the type of the system information, and reducing complexity of a system design.

In an optional design, the network device sends a demodulation reference signal DMRS of the physical resource carrying the system information. The terminal device obtains, based on a frequency domain reference point, the demodulation reference signal DMRS corresponding to the physical resource carrying the system information. The frequency domain reference point corresponds to the type of the system information. For example, a first frequency domain reference point corresponds to first-type system information, and a second frequency domain reference point corresponds to second-type system information. The first frequency domain reference point is different from the second frequency domain reference point, and the first-type system information is different from the second-type system information.

Specifically, a correspondence between the frequency domain reference point and the type of the system information is preconfigured or predefined. Alternatively, the frequency domain reference point is indicated by using second indication information.

On a premise that the correspondence between the frequency domain reference point and the type of the system information is preconfigured or predefined, the terminal device may obtain information about the frequency domain reference point by using the indication information of the type of the system information, so that both the type of the system information and the frequency domain reference point are obtained without using additional indication information or fields, thereby improving communication efficiency, and simplifying the system design.

In addition, a time domain resource and/or frequency domain resource of the PDCCH is indicated by using information carried in a synchronization/broadcast channel block.

According to a second aspect, an embodiment of the application provides a wireless apparatus, including a processor and a receiver, where the processor is configured to detect a physical downlink control channel PDCCH carrying downlink control information, where the PDCCH carries indication information, and the indication information is used to indicate a type of system information;

the processor is configured to determine, based on the indication information, a physical resource carrying the system information; and the receiver is configured to receive the system information on the physical resource.

A cyclic redundancy code CRC included in the PDCCH is scrambled with a radio network temporary identifier RNTI.

In an optional design, the indication information is a value of the RNTI.

The value of the RNTI is a first radio network temporary identifier RNTI, and the downlink control information is used to indicate first-type system information; and/or the value of the RNTI is a second radio network temporary identifier RNTI, and the downlink control information is used to indicate second-type system information.

In an optional design, the indication information is format indication information, and the format indication information is carried in the downlink control information.

Optionally, the processor is configured to obtain, based on a frequency domain reference point, a demodulation reference signal DMRS corresponding to the physical resource carrying the system information; and the frequency domain reference point corresponds to the type of the system information.

Further, optionally, a correspondence between the frequency domain reference point and the type of the system information is preconfigured or predefined. Alternatively, the frequency domain reference point is indicated by using second indication information.

A time domain resource and/or frequency domain resource of the PDCCH is indicated by using information carried in a synchronization/broadcast channel block.

An embodiment of the application provides a network device, including a transmitter and a processor, where the transmitter is configured to send a physical downlink control channel PDCCH carrying downlink control information, where the PDCCH carries indication information, and the indication information is used to indicate a type of system information; and the processor is configured to determine, based on the type of the system information, a physical resource carrying the system information.

The PDCCH includes a cyclic redundancy code CRC, and the processor is configured to scramble the CRC by using a radio network temporary identifier RNTI.

In an optional design, the indication information is a value of the RNTI.

The value of the RNTI is a first radio network temporary identifier RNTI, and the downlink control information is used to indicate first-type system information; and/or the value of the RNTI is a second radio network temporary identifier RNTI, and the downlink control information is used to indicate second-type system information.

In an optional design, the indication information is format indication information, and the format indication information is carried in the downlink control information.

Optionally, the transmitter is configured to send a demodulation reference signal DMRS of the physical resource carrying the system information. The DMRS corresponds to a frequency domain reference point, and the frequency domain reference point corresponds to the type of the system information.

Further, optionally, a correspondence between the frequency domain reference point and the type of the system information is preconfigured or predefined. Alternatively, the transmitter is configured to send second indication information, where the second indication information is used to indicate the frequency domain reference point corresponding to the type of the system information.

A time domain resource and/or frequency domain resource of the PDCCH is indicated by using information carried in a synchronization/broadcast channel block.

According to a third aspect, the application provides a system, including at least the two apparatuses according to the second aspect.

According to a fourth aspect, the application provides a wireless apparatus, including one or more processors and a memory, where the memory stores a computer program, and when the processor executes the computer program, the apparatus is enabled to implement any method according to the first aspect.

According to a fifth aspect, the application provides a computer storage medium that stores a computer program, where the computer program is stored in the computer storage medium, and when the computer program is executed by a processor or a device (a terminal device or a network device)), any method according to the first aspect is implemented.

According to a sixth aspect, the application provides a computer program product that includes an instruction, and when the instruction is run on a computer, the computer is enabled to perform any method according to the first aspect.

According to a seventh aspect, the application provides a chip system. The chip system includes a processor, configured to support a network device or an apparatus in implementing a function in the first aspect, for example, generating or processing data and/or information in the foregoing method. In a possible design, the chip system further includes a memory. The memory is configured to store a program instruction and data that are necessary for the network device or a communications apparatus. The chip system may include a chip, or may include a chip and another discrete component.

According to an eighth aspect, the application provides a chip. The chip includes a processing module and a communications interface. The processing module is configured to control the communications interface to perform external communication. The processing module is further configured to implement any method according to the first aspect.

Compared with the prior art, in the solutions provided in embodiments of the application, the type of the system information that needs to be sent can be flexibly indicated, and by using fewer resource overheads, the terminal device can correctly receive the system information of the type on the physical resource carrying the system information.

BRIEF DESCRIPTION OF DRAWINGS

The following describes embodiments of the application in detail with reference to accompanying drawings.

DESCRIPTION OF EMBODIMENTS

A network architecture and a service scenario described in the embodiments of the application are intended to describe the technical solutions in the embodiments of the application more clearly, and do not constitute a limitation on the technical solutions provided in the embodiments of the application. A person of ordinary skill in the art can learn that, with evolution of the network architecture and emergence of a new service scenario, the technical solutions provided in the embodiments of the application are also applicable to similar technical problems.

In the embodiments of the application, "a plurality of" means two or more than two. The term "and/or" describes an association relationship between associated objects and represents that three relationships may exist. For example, A and/or B may represent the following three cases: only A exists, both A and B exist, and only B exists. The character "/" generally indicates an "or" relationship between the associated objects.

Figure 1:
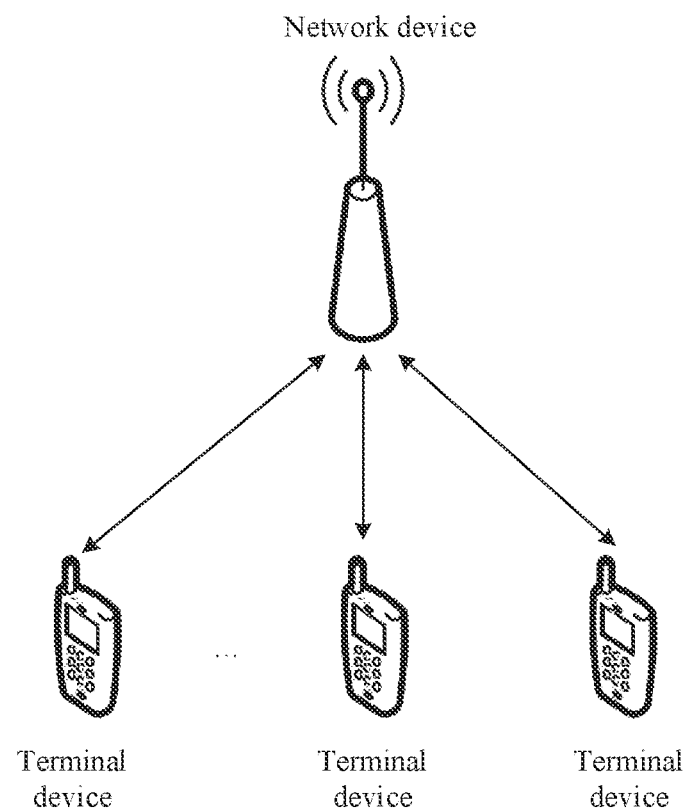
FIG. 1 is a possible schematic diagram of an application scenario according to an embodiment of the application.

FIG. 1 is a possible schematic diagram of an application scenario according to an embodiment of the application. A communications system in the application scenario includes a network device and one or more terminal devices. The network device may communicate with the terminal devices by using one or more air interface technologies.

The following describes terms that may appear in the embodiments of the application.

A communications system may be applicable to a long term evolution (Long Term Evolution, LTE for short) system or another wireless communications system that uses various radio access technologies, for example, a system that uses access technologies such as code division multiple access, frequency division multiple access, time division multiple access, orthogonal frequency division multiple access, and single carrier frequency division multiple access. In addition, the communications system may also be applicable to an evolved LTE system for example, a 5th generation 5G system.

A network device may be a base station, an access point, an access network device, or a device that is in an access network and that communicates with a wireless terminal through one or more sectors on an air interface. The network device may be configured to mutually convert a received over-the-air frame and an IP packet and serve as a router between the wireless terminal and a remaining portion of the access network, where the remaining portion of the access network may include an Internet protocol (IP) network. The network device may further coordinate attribute management of the air interface. For example, the network device may be a base transceiver station (Base Transceiver Station. BTS) in a global system for mobile communications (Global System for Mobile Communications, GSM) or code division multiple access (Code Division Multiple Access, CDMA), or may be a NodeB (NodeB, NB) in wideband code division multiple access (Wideband Code Division Multiple Access, WCDMA), or may be an evolved NodeB (Evolutional Node B, eNB or eNodeB) in long term evolution (Long Term Evolution, LTE), a relay node or an access point, or a base station in a future 5G network, for example, a gNB. This is not limited herein. It should be noted that, in a 5G or NR system, there may be one or more transmission reception points (Transmission Reception Point, TRP) on one NR gNB. All TRPs belong to a same cell, and each TRP and each terminal can use a measurement reporting method described in this embodiment of the application. In another scenario, the network device may be further divided into a control unit (Control Unit, CU) and a data unit (Data Unit, DU). One CU may correspond to a plurality of DUs. Each DU and each terminal can use the measurement reporting method described in this embodiment of the application. A difference between a CU-DU separation scenario and a multi-TRP scenario lies in that, the TRP is merely a radio frequency unit or an antenna device while the DU can implement a protocol stack function, for example, the DU can implement a physical layer function.

A terminal device may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (Personal Communication Service, PCS) phone, a cordless telephone, a session initiation protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), or a user device (User Device or User Equipment). This not limited in the application.

A symbol includes but is not limited to an orthogonal frequency division multiplexing (Orthogonal Frequency Division Multiplexing. OFDM) symbol, a sparse code multiple access (Sparse Code Multiplexing Access, SCMA) symbol, a filtered orthogonal frequency division multiplexing (Filtered Orthogonal Frequency Division Multiplexing, F-OFDM) symbol, and a non-orthogonal multiple access (Non-Orthogonal Multiple Access, NOMA) symbol. The symbol may be specifically determined based on an actual case. Details are not described herein.

A control resource set (Control Resource Set. CORESET) is a resource set used for control channel transmission. Time domain resources in a CORESET may be consecutive or inconsecutive.

A subframe occupies a time-frequency resource of entire system bandwidth in frequency domain, and occupies a fixed time length in time domain, for example, one millisecond (ms), In addition, one subframe may also occupy K consecutive symbols, where K is a natural number greater than 0. A value of K may be determined based on an actual case, and this is not limited herein. For example, in LTE, one subframe occupies 14 consecutive OFDM symbols in time domain.

A slot is a basic time-frequency resource unit, and occupies L consecutive OFDM symbols in time domain, where L is a natural number greater than 0. A value of L may be determined based on an actual case. For example, there may be seven OFDM symbols.

A physical resource block (Physical Resource Block, PR) is a frequency domain resource unit and occupies M contiguous subcarriers in frequency domain, where M is a natural number greater than 0. For example, M is equal to 12 or 16.

A bandwidth part (Bandwidth part, BWP) is a plurality of contiguous physical resource blocks in frequency domain, and the physical resource blocks are generally configured by a network device for a terminal device. The terminal device receives or sends data in the BWP. In an example of control resource transmission, one BWP includes at least one control resource set, and frequency domain resources included in the control resource set do not exceed a plurality of physical resource blocks included in the BWP in frequency domain. The BWP is classified into an initial active bandwidth part (Initial active BWP) and a UE-specific bandwidth part (UE-specific BWP), The initial active BWP is configured by using broadcast information, for example, a master information block (master information block, MIB), and the UE-specific BWP is configured by using UE-specific radio resource control (radio resource control, RRC) signaling.

Initial active bandwidth part (Initial active BWP): Before entering a connected mode or obtaining terminal device-specific BWP configuration information, a terminal device needs to receive or send data on the initial active BWP. Specifically, a frequency domain location and a bandwidth size of the initial active BWP are configured by using broadcast information. In addition, the bandwidth size is equal to a frequency domain range occupied by a control resource set CORESET configured by using the broadcast information.

A common index scheme (Common Index Scheme) is an index scheme stipulated in a standard or a protocol, determined by a network device in a communications system, or determined by a plurality of network devices in a communications system through negotiation. The index scheme is used for resource configuration. In the communications system, a control resource and/or a data resource configured by a network device for a terminal device served by the network device are/is located in a common index area determined based on the common index scheme.

A common index area is a plurality of contiguous physical resource blocks in frequency domain that are obtained based on a common index scheme (common index scheme). A bandwidth part BWP is located in the common index area.

A demodulation reference signal, DMRS (Demodulation reference signal) for short, is used for demodulating a received physical channel. Specifically, a DMRS carried on the physical channel is a DMRS signal generated by mapping a DMRS sequence to a physical resource. For example, a downlink DMRS may be used to demodulate a physical downlink shared channel PDSCH.

System information, SI (System information) for short, is used to configure a frequency domain reference point of an access bandwidth, and used for a resource for random access and/or an uplink/downlink resource, and the like. The system information includes a plurality of types of system information, for example, RMSI or a SIB1, and other system information OSI (Other system information), for example, a SIB2. The OSI herein may include all types of system information except the RMSI.

Figure 2:
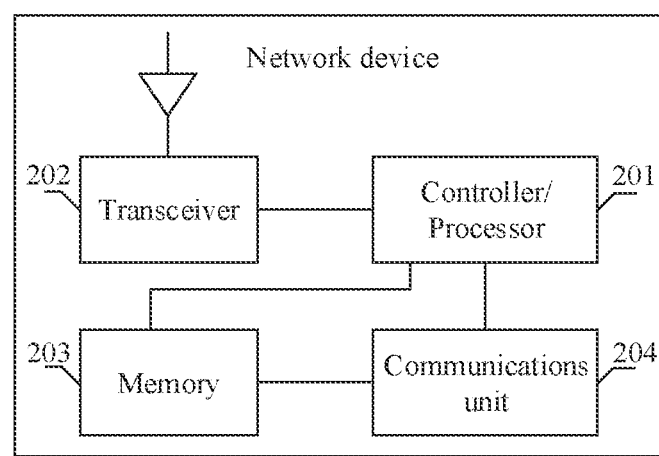
FIG. 2 is a possible schematic structural diagram of a network device according to an embodiment of the application.

Further, a possible schematic structural diagram of the foregoing network device may be shown in FIG. 2. A network device can perform the method provided in the embodiments of the application. The network device may include a controller or processor 201 (the following uses the processor 201 as an example for description) and a transceiver 202. The controller/processor 201 sometimes may also be referred to as a modem processor (modem processor). The modem processor 201 may include a baseband processor (baseband processor, BBP) (not shown). The baseband processor processes a received digitalized signal, to extract information or a data bit transmitted in the signal. Therefore, based on a requirement or an expectation, the BBP is usually implemented in one or more digital signal processors (digital signal processor, DSP) in the modem processor 201 or implemented as a separated integrated circuit (integrated circuit, IC).

The transceiver 202 may be configured to support sending and receiving information between a network device and a terminal device, and support radio communication between terminal devices. The processor 201 may be further configured to perform various functions for communication between the terminal device and the network device. In uplink, an uplink signal from the terminal device is received by using an antenna, demodulated by the transceiver 202, and further processed by the processor 201, to restore service data and/or signaling information sent by the terminal device. In downlink, service data and/or a signaling message are/is processed by the terminal device, modulated by the transceiver 202 to generate a downlink signal, and transmitted by the antenna to the terminal device. The network device may further include a memory 203, and the memory 203 may be configured to store program code and/or data of the network device. The transceiver 202 may include an independent receiver and transmitter circuit, or may implement receiving and sending functions in one circuit. The network device may further include a communications unit 204, and the communications unit 204 is configured to support communication between the network device and another network entity. For example, the network device is configured to support communication between the network device and a network device of a core network, and the like.

Optionally, the network device may further include a bus. The transceiver 202, the memory 203, and the communications unit 204 may be connected to the processor 201 by using the bus. For example, the bus may be a peripheral component interconnect (Peripheral Component interconnect, PCI) bus, an extended industry standard architecture (Extended Industry Standard Architecture, EISA) bus, or the like. The bus may include an address bus, a data bus, a control bus, and the like.

Figure 3:
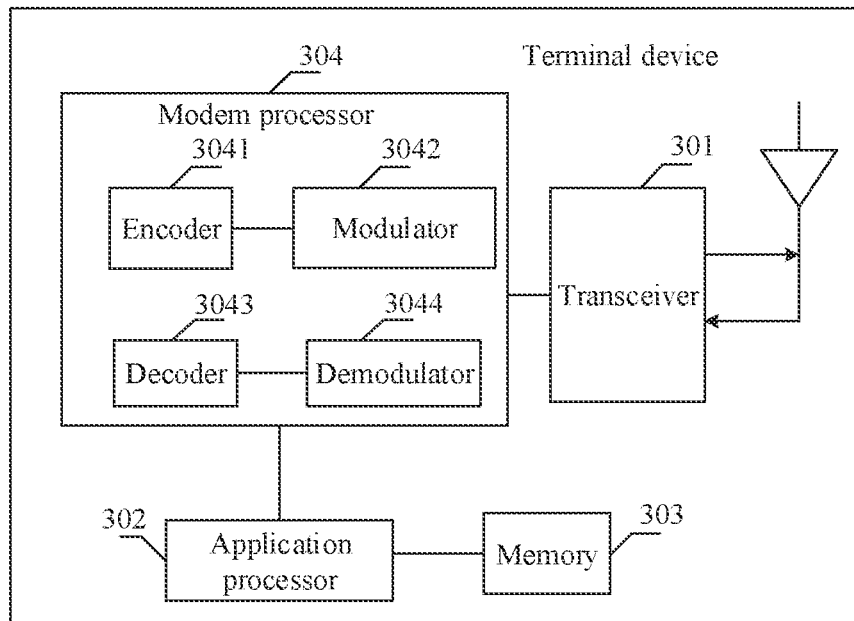
FIG. 3 is a possible schematic structural diagram of a terminal device according to an embodiment of the application.

FIG. 3 is a possible schematic structural diagram of the terminal device in the foregoing communications system. The terminal device can perform the method provided in the embodiments of the application. The terminal device may be any one of one or more terminal devices in FIG. 1. The terminal device includes a transceiver 301, an application processor (application processor) 302, a memory 303, and a modem processor (modem processor) 304.

The transmitter 301 may adjust (for example, perform analog conversion, filtering, amplification, and up-conversion on) an output sample and generate an uplink signal. The uplink signal is transmitted to the base station in the foregoing embodiment by using an antenna. In downlink, the antenna receives a downlink signal transmitted by a network device. The transceiver 301 may adjust (for example, perform filtering, amplification, down-conversion, and digitalization on) a signal received from the antenna and provide an input sample.

The modem processor 304 is sometimes referred to as a controller or processor, and may include a baseband processor (baseband processor, BBP) (not shown). The baseband processor processes a received digitalized signal, to extract information or a data bit transmitted in the signal. Based on a requirement or an expectation, the BBP is usually implemented in one or more digital signal processors in the modem processor 304 or implemented as a separated integrated circuit (IC).

In a design, the modem processor (modem processor) 304 may include an encoder 3041, a modulator 3042, a decoder 3043, and a demodulator 3044. The encoder 3041 is configured to encode a to-be-sent signal. For example, the encoder 3041 may be configured to receive service data and/or a signaling message that are/is to be sent in uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on the output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. These units perform processing based on a radio access technology used in a radio access network.

The modem processor 304 receives, from the application processor 302, digitalized data that may represent voice, data, or control information, and processes the digitalized data for transmission. The modem processor may support one or more of a plurality of wireless communication protocols of a plurality of communications systems, for example, LTE, new radio, a universal mobile telecommunications system (Universal Mobile Telecommunications System, UMTS), and high speed packet access (High Speed Packet Access, HSPA). Optionally, the modem processor 304 may also include one or more memories.

Optionally, the modem processor 304 and the application processor 302 may be integrated in one processor chip.

The memory 303 is configured to store program code (sometimes also referred to as a program, an instruction, software, or the like) and/or data that are/is used to support communication of the terminal device.

It should be noted that the memory 203 or the memory 303 may include one or more storage units, for example, may be a storage unit that is in the processor 201, the modem processor 304, or the application processor 302 and that is configured to store program code, or may be an external storage unit independent of the processor 201, the modem processor 304, or the application processor 302, or may be further a component including a storage unit inside the processor 201, the modem processor 304, or the application processor 302 and an external storage unit independent of the processor 201, the modem processor 304, or the application processor 302.

The processor 201 and the modem processor 304 (the processor 304 for short hereinafter) may be processors of a same type or processors of different types. For example, the processor 201 and modem processor 304 may be implemented as a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logic device, a transistor logic device, a hardware component, another integrated circuit, or any combination thereof. The processor 201 and the modem processor 304 may implement or execute various example logical blocks, modules, and circuits described with reference to content disclosed in the embodiments of the application. The processor may also be a combination that implements a computing function device, for example, a combination including one or more microprocessors, a combination of a DSP and a microprocessor, or a system-on-a-chip (system-on-a-chip, SOC).

A person skilled in the art can understand that various explanatory logic blocks, modules, circuits, and algorithms described with reference to the various aspects disclosed in this application may be implemented as electronic hardware, an instruction that is stored in a memory or another computer readable medium and that is executed by a processor or another processing device, or a combination thereof. As an example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality, How to implement such functionality depends on a specific application, a design selection, and/or a design constraint that is imposed on an entire system. A person skilled in the art may use different manners to implement the described functions for each particular application, but it should not be considered that such implementation goes beyond the scope of the application.

In the embodiments of the application, sending a downlink (uplink) channel may be sending data or information carried on the downlink (uplink) channel. The data or information may be data or information obtained after channel coding.

It should be noted that, a term "start resource block" is used in the embodiments of the application. The term may refer to a resource block having a minimum subcarrier sequence number in resource blocks included in a specific area (for example, a common index area or a bandwidth part), or a resource block having a minimum sequence number when included resource blocks are numbered from a low frequency to a high frequency, or may refer to a resource block having a maximum subcarrier sequence number in resource blocks included in a specific area (for example, a common index area or a bandwidth part), or a resource block having a maximum sequence number when included resource blocks are numbered from a low frequency to a high frequency. The low frequency and the high frequency are defined in relative to a subcarrier sequence number, and a subcarrier sequence number of a low frequency location is less than a subcarrier sequence number of a high frequency location. No specific limitation is imposed in the embodiments. A specific meaning of the start resource block depends on a requirement of an actual communications system, a notification from the network device, or a stipulation in a standard or a protocol. In the embodiments of the application, an example in which the start resource block is the resource block having the minimum subcarrier number in the resource blocks included in the specific area (for example, the common index area or the bandwidth part), or the resource block having the minimum sequence number when the included resource blocks are numbered from the low frequency to the high frequency is used for description.

A person skilled in the art may know that there are a plurality of types of system information, and a physical downlink shared channel (physical downlink shared channel, PDSCH) carrying RNISI or OSI is used as an example in this specification. However, the embodiments of the application are not limited thereto, and all types of system information and physical channels or physical resources that may be used in the embodiments of the application shall fall within the protection scope of the application.

Figure 4:
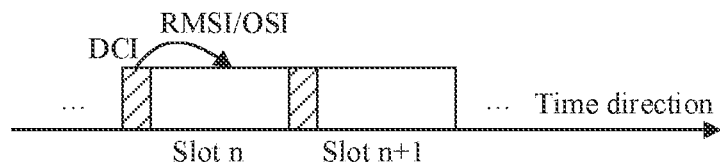
FIG. 4 is a schematic diagram of a method of system message scheduling in time domain.

A person skilled in the art may know that the PDSCH is scheduled by using downlink control information. The terminal device needs to detect downlink control information (downlink control information, DCI) carried on a physical downlink control channel (physical downlink control channel, PDCCH), to further obtain system information carded on the PDSCH to access a serving cell or a carrier. For details, refer to FIG. 4.

Because a system bandwidth on a network device side in an NR system is greater than a bandwidth actually accessed by the terminal device, a configuration of a frequency domain reference point is introduced. A granularity of the frequency domain reference point may be a resource block, or may be a subcarrier in a resource block, for example, a subcarrier having a minimum number or a subcarrier numbered 0 in the resource block. In this embodiment of the application, an example in which the granularity of the frequency domain reference point is the resource block is used for description, but the protection scope is not limited thereto.

The configuration of the frequency domain reference point in this embodiment of the application may have the following various optional designs.

In an optional design, the frequency domain reference point is irrelevant to a type of system information, and frequency domain reference points corresponding to different types of system information are the same or different.

In another optional design, the frequency domain reference point is related to the type of the system information, and different types of system information correspond to different frequency domain reference points. For example, RMSI is first-type system information, OSI is second-type system information, and the RMSI and the OSI correspond to different frequency domain reference points. Specifically, frequency domain positions of the PDSCH carrying the RMSI or OSI are different due to the different frequency domain reference points, and/or DMRSs used to demodulate the PDSCH are different due to the different frequency domain reference points.

Optionally, a frequency domain reference point on the network device side is configured by using the system information RMSI, so that before the terminal device obtains the RMSI, the frequency domain reference point is configured as a start resource block of an initial active BWP (or in a control channel resource set configured by a broadcast channel) or a subcarrier numbered 0 in a start resource block of an initial active BWP, and the frequency domain reference point may be denoted as a frequency domain reference point A. After receiving the RMSI, the terminal device can determine a common frequency domain reference point in a broadband carrier configured by a network device, where the common frequency domain reference point is a start resource block of a common index area or a subcarrier numbered 0 in a start resource block of a common index area, and the common frequency domain reference point may be denoted as a frequency domain reference point B. Further, the frequency domain reference point affects determining of the frequency domain location of the PDSCH carrying the RMSI or OSI and/or the DMRS of the PDSCH carrying the RMSI or OSI.

Specifically, before demodulating the PDSCH, the terminal device needs to obtain a DMRS sequence, where the DMRS sequence is generated by intercepting a part of a sequence from a reference DMRS sequence. The terminal device matches a received DMRS signal based on a locally generated or obtained DMRS sequence, and demodulates and/or decodes the PDSCH. Further, if different types of system information correspond to a same frequency domain reference point and a same DMRS, the terminal device may correctly demodulate the PDSCH. If different frequency domain reference points correspond to different system information types, DMRS sequences that are obtained from the reference DMRS sequence and that correspond to different information types are also different. If the DA/IRS sequences obtained by the terminal device do not match a DMRS signal sent by the network device, the terminal device cannot correctly demodulate and receive the PDSCH. The reference DMRS sequence is a Gold sequence generated based on configuration information or a predefined parameter. For example, the terminal device generates the Gold sequence based on obtained identity information or a cell identity (ID). The Gold sequence is a pseudorandom sequence proposed on a basis of an m-sequence. For details, refer to the prior art. The reference DMRS sequence includes a plurality of values, and each value may be a complex value. For DMRS demodulation, refer to description in the prior art or demodulation performed by using the prior art.

For example, a resource occupied by the DMRS in each RB in a given OFDM symbol is two REs, and if a system information type corresponds to a frequency domain reference point A, a mapped DMRS sequence in the $n^{th}$ RB in the initial active BWP is the $2n^{th}$ value and the $(2n+1)^{th}$ value in the reference DMRS sequence. If the system information type corresponds to a frequency domain reference point B, and an RB number of the start resource block of the initial active BWP in the common index area is no, the mapped.

DMRS sequence in the $n^{th}$ RB in the initial active BWP is the $2(n_0+n)^{th}$ value and the $(2(n_0+n)+1)^{th}$ value in the reference DMRS sequence.

In addition, the terminal device obtains a PDSCH frequency domain resource based on the frequency domain reference point. If the frequency domain reference points are different, PDSCH frequency domain resource locations obtained by the terminal device are also different. For example, one bit in PDSCH frequency domain resource indication information that is included in the DCI corresponds to one RB group (RB Group, RBG) in frequency domain, and RBs included in the RB group are a plurality of contiguous RBs in frequency domain. The RB group is generated by grouping RBs from a low frequency to a high frequency and starting from the frequency domain reference point. RBs in different RB groups do not overlap, and a quantity of RBs included in the plurality of RB groups is in a decreasing trend from a low frequency to a high frequency. Optionally, the plurality of RB groups may further include at least two RB groups that are adjacent in frequency domain and that have a same quantity of RBs, and the quantity is in an overall decreasing trend. For example, a quantity of RBs in the RB group at a high frequency location is not greater than a quantity of RBs in the RB group at a frequency domain location lower than the high frequency location. Further, an RB group starting from the frequency domain reference point A and an RB group starting from the frequency domain reference point B are RB groups classified based on different frequency domain reference points, Even if the PDSCH frequency domain resource indication information indicated by using the DCI are the same, the PDSCH frequency domain locations are also different.

Figure 5:
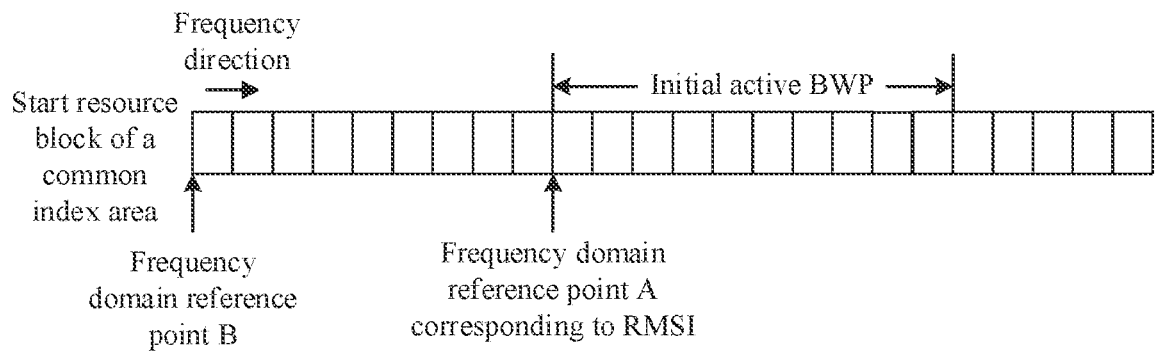
FIG. 5 is a schematic diagram of a location of a frequency domain reference point corresponding to a type of system information.

An example in which the system information type is RMSI or OSI is used, as shown in FIG. 5, a reference point of a PDSCH frequency domain location carrying the RMSI is a reference point A, and a reference point of a PDSCH frequency domain location carrying the OSI is a reference point B. The terminal device obtains PDSCH resource indication information. When the frequency domain reference point A is different from the frequency domain reference point B, PDSCH frequency domain locations indicated by the PDSCH resource indication information are also different corresponding to different frequency domain reference point A or B.

It can be learned from the foregoing that if different system information types and/or frequency domain reference points corresponding to the system information types cannot be distinguished, system information fails to be received, and consequently, the terminal device cannot access a serving cell or a carrier.

In an optional solution, a type of the system information may be associated with a time domain location, and the association relationship may be predefined or preconfigured, for example, predefined in a standard or a protocol. Specifically, for example, a time domain location of downlink control information used to indicate the RMSI (or may also be referred to as a time domain location corresponding to the RMSI) is predefined or preconfigured as, for example, the first slot and the eleventh slot in every 20 slots (Slot).

The network device sends, on a predefined first time domain resource, the downlink control information used to indicate the RMSI, and the RMSI corresponds to the frequency domain reference point A in FIG. 5. It should be noted herein that, if the downlink control information used to indicate a system information type except the RMSI overlaps the time domain resource, the network device preferentially sends the downlink control information used to indicate the RMSI, to ensure that the terminal device can detect, on the predefined time domain resource, the downlink control information used to indicate the RMSI. In this case, the terminal device detects, only in a predefined time domain resource area (also referred to as monitor window (monitor window) herein), the downlink control information used to indicate that the system information is the RMSI, the terminal device may determine, based on the frequency domain reference point A, B, or another possible frequency domain reference point, a frequency domain location of a PDSCH carrying the RMSI and a corresponding DMRS sequence.

If downlink control information used to indicate system information is detected in a second time domain resource area (namely, outside the monitor window), the terminal device determines, based on the frequency domain reference point A, B, or another possible frequency domain reference point, a frequency domain location of a PDSCH carrying other system information OSI that is different from the RMSI and a DMRS sequence.

The terminal device detects RNTI information scrambled with a CRC in a PDCCH carrying the downlink control information, and the RNTI information is used to determine that the detected downlink control information is used to instruct to receive the system information. For example, if the RNTI information is an SI-RNTI, the detected downlink control information is used to instruct to receive the system information. For scrambling and descrambling of the RNTI, refer to description in the prior art, or the scrambling and descrambling may be implemented in a manner in the prior art. This is not specifically limited herein.

In the foregoing solution, a time domain resource on which the downlink control information is used to indicate the reception of the system information is associated with type of the system information, and resource scheduling is also limited when the type of the system information is implicitly indicated. As a result, resource overheads of the network device increase and scheduling is not flexible enough. In addition, the terminal device cannot accurately obtain frequency domain reference point information. As a result, the terminal device cannot correctly demodulate and/or decode a physical resource carrying the downlink control information.

To resolve the foregoing technical problem, an embodiment of the application further provides a communication method, to implement flexible indication of a system information type with fewer resource overheads.

The following further describes this embodiment of the application in detail based on a common aspect of the application described above. Possible uplink and downlink latencies are ignored in descriptions of this embodiment. It is assumed that a sending moment of a network device is the same as a receiving moment of a terminal device. For processing corresponding to sending operation of the network device and receiving operation of the terminal device, this embodiment is described mainly from a perspective of a terminal device side, A person skilled in the art may understand that, the receiving of the terminal device from the network device means that the network device performs sending.

In addition, sequence numbers of steps in this embodiment of the application do not limit a sequence of a specific execution process. An execution sequence of the steps is adaptively adjusted in different optional designs.

Embodiment 1

An embodiment of the application provides a communication method. In the method, a network device sends a physical downlink control channel PDCCH, a terminal device detects a physical downlink control channel PDCCH carrying downlink control information, the PDCCH carries indication information, where the indication information is used to indicate a type of system information, and the terminal device determines, based on the indication information, a physical resource carrying the system information. According to the method provided in Embodiment 1 of the application, a type of the system information can be flexibly indicated without increasing resource overheads.

Figure 6:
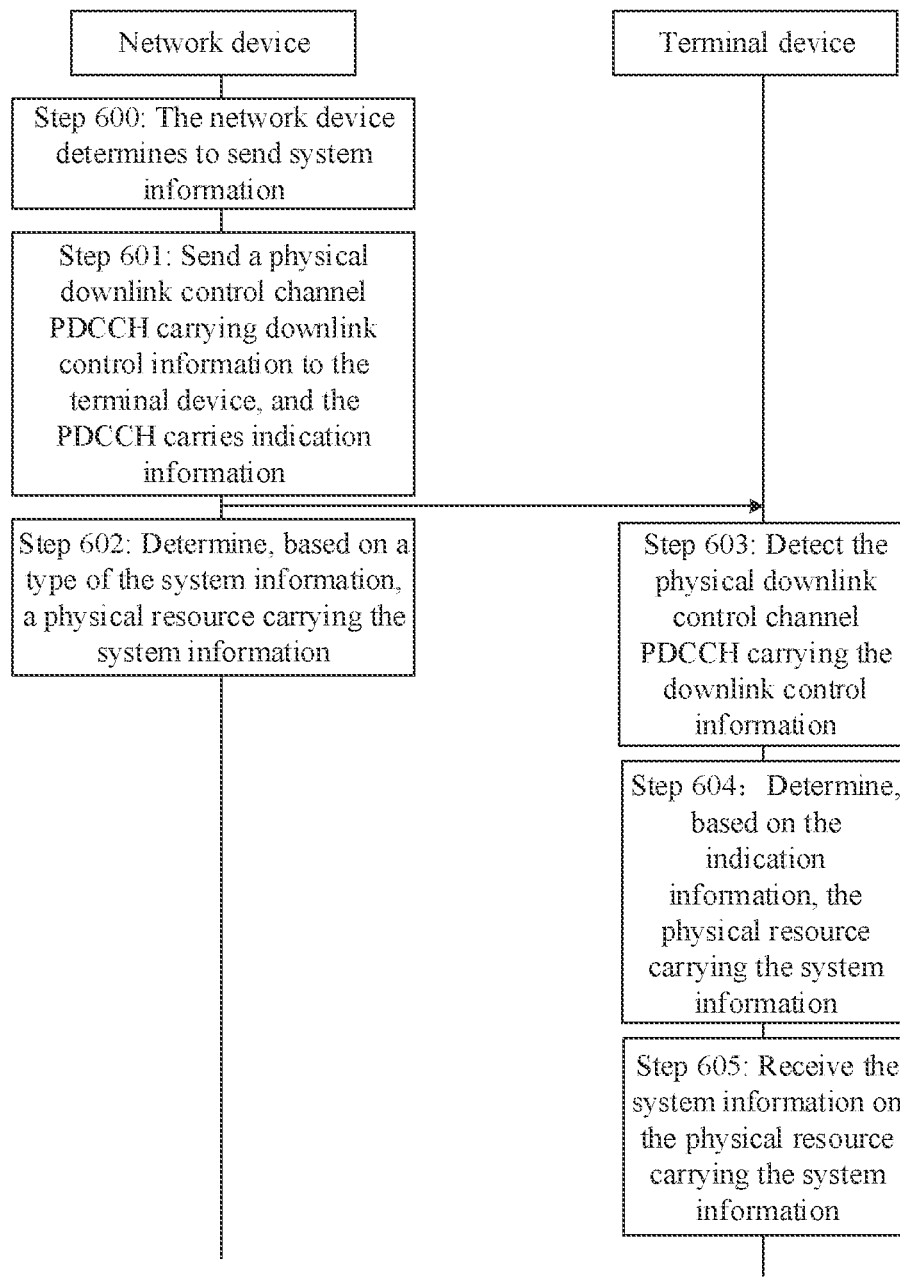
FIG. 6 is a possible schematic flowchart of a communication method according to an embodiment of the application.

FIG. 6 shows a specific implementation of the communication method in Embodiment 1 of the application. The following describes a solution provided in Embodiment 1 of the application with reference to FIG. 6.

Step 600: A network device determines to send system information, and the system information is first-type system information or second-type system information.

Optionally, the first-type system information is RMSI or a system information block type1 (SystemInforination-BlockType1, SIB1), and/or the second-type system information is OSI or a system information SI message.

Before step 600, the network device determines, based on a status of a current communications system and/or a further scheduling requirement, that specific-type system information, for example, the RMSI, the SIB1, or an SIB2, needs to be sent. Details are not described herein, and a specific manner may be the same as that in the prior art.

The determining step may be performed by a processor of the network device.

Step 601: The network device sends a physical downlink control channel PDCCH carrying downlink control information, the PDCCH carries indication information, and the indication information is used to indicate a type of system information.

The sending step may be performed by a transmitter of the network device.

Before step 601, the method further includes the following step: The network device indicates a time domain resource and/or frequency domain resource of the PDCCH by using information carried in a synchronization/broadcast channel block.

Specifically, a master information block MIB carried on a broadcast channel in the synchronization/broadcast channel block (synchronous signal/physical broadcast channel block, SS/PBCH block) includes configuration information of the time domain resource and/or frequency domain resource of the PDCCH. Specifically, N high-order bits in an RMSI-PDCCH-Config field in the MIB are used to configure a quantity of a plurality of contiguous resource blocks in frequency domain and a quantity of a plurality of consecutive OFDM symbols in time domain, and M low-order bits in the RMSI-PDCCH-Config field are used to configure a monitoring occasion (monitoring occasion) of the PDCCH, where both M and N are positive integers, Optionally, M=N=4. Further, four bits may indicate 16 bit values or bit states, and a correspondence exists between different bit values or bit states and resource configurations. The correspondence may be preconfigured or predefined, for example, predefined in a table of a standard or protocol.

Step 602: The network device determines, based on the type of the system information, a physical resource carrying the system information.

The physical resource may be a time domain resource and/or frequency domain resource of a physical downlink shared channel PDSCH.

The frequency domain resource may be determined by the network device in a plurality of manners, for example, may be determined in a same or similar manner as that of a terminal device. For details, refer to the foregoing description.

Optionally, the network device obtains a DMRS sequence based on a frequency domain reference point or the type of the system information, and the DMRS sequence is a part of a reference DMRS sequence, for example, may be generated by intercepting a part of sequence from a reference DMRS sequence. Further, the network device determines the frequency domain location of the PDSCH. The network device modulates the DMRS sequence onto the physical resource, and sends the PDSCH carrying the system information.

Specifically, based on the foregoing description, DCI carried on the PDCCH includes PDSCH frequency domain resource indication information, and the PDSCH frequency domain resource indication information is used to notify the terminal device of a frequency domain resource of the PDSCH. A length of a bit sequence included in the PDSCH frequency domain resource indication information is related to a frequency domain size of a BWP on which the PDSCH scheduled by using the DCI is located, and each bit indicates one RBG Alternatively, values or bit states of a group of bits correspond to a plurality of contiguous RBs on a frequency domain resource. The PDSCH frequency domain resource indication information may include one or more bits, each bit corresponds to one RB group (RB Group, RBG) in frequency domain, and RBs included in the RB group are a plurality of contiguous RBs in frequency domain. For the terminal device, the frequency domain resource of the PDSCH is determined by using the frequency domain reference point and the PDSCH frequency domain resource indication information included in the DCI.

The network device may determine the time domain resource in a plurality of manners.

Optionally, the time domain resource may be predefined or preconfigured, and is notified to the terminal device in advance.

Optionally, the time domain resource is dynamically or semi-statically configured by the network device, and is notified to the terminal device by using the DCI. Further, optionally, the network device may directly indicate the time domain resource by using the DCI, or instruct, by using the DCI, the terminal device to determine the time domain resource. For example, an index of the time domain resource is indicated by using the DCI, and the index is used to indicate the time domain resource, so that the terminal device determines a location of the time domain resource by using the index.

The determining step may be performed by the processor 201 of the network device.

Step 603: The terminal device detects the physical downlink control channel PDCCH carrying the downlink control information, and the PDCCH carries the indication information.

Before step 601, a cyclic redundancy code (cyclic redundancy code, CRC) included in the PDCCH is scrambled by a radio network temporary identifier RNTI, and the scrambled. CRC is used by the terminal device to detect whether a received PDCCH is correct and a scheduling type of the PDCCH.

The detection step may be performed by a processor of the terminal device, or may be performed by a transceiver controlled by a processor of the terminal device.

The detection in step 603 is blind detection. Specifically, the network device scrambles the CRC included in the PDCCH in step 601, and the scrambling is performed on 16 low-order bits of the CRC based on a value of the RNTI. The terminal device performs blind detection based on the RNTI, and determines, based on that the RNTI of the DCI that is successfully detected is an SI-RNTI, that information needed to be received is the system information. The RNTI further includes a C-RNTI, alp RA-RNTI, and the like. For a specific type of the RNTI, refer to the prior art. Details are not described herein.

Optionally, the indication information may be a value of the RNTI used for scrambling, or may be information carried in the DCI, for example, one or more bits. For details, refer to description in the following embodiments.

Step 604: The terminal device determines, based on the indication information, a physical resource carrying the system information.

The physical resource may be a time domain resource and/or frequency domain resource of a physical downlink shared channel PDSCH.

For a determining manner of the frequency domain resource, refer to the foregoing description.

Specifically, the terminal device may obtain, based on a frequency domain reference point and PDSCH frequency domain resource indication information included in the DCI, the frequency domain resource of the PDSCH. The PDSCH frequency domain resource indication information is used to indicate one or more RB groups corresponding to the PDSCH. Before demodulating the PDSCH, the terminal device needs to obtain a DMRS sequence, for example, determine the DMRS sequence based on the frequency domain reference point. The DMRS sequence is a part of a reference DMRS sequence. For example, the DMRS sequence may be generated by intercepting the part of the sequence from the reference DMRS sequence. The terminal device matches a received DMRS signal based on a locally generated or obtained DMRS sequence, and demodulates and/or decodes the PDSCH.

The terminal device may determine the time domain resource in one of a plurality of optional manners.

Optionally, the time domain resource may be predefined or preconfigured, and is notified to the terminal device in advance.

Optionally, the time domain resource is dynamically or semi-statically configured by the network device, and is notified to the terminal device by using the DCI, Further, optionally, the terminal device may directly determine the time domain resource by using information carried in the DCI, or the terminal device further determines, by using the information carried in the DCI, the time domain resource. For example, what the DCI notifies is an index of the time domain resource, and the terminal device further determines the time domain resource by using the index. Optionally, a correspondence between the index and the time domain resource is predefined or preconfigured, for example, predefined in a standard or a protocol. The correspondence may be shown in Table 1.

TABLE 1

| Index (index) | Time interval K0 | Indication information RIV |
|---|---|---|
| 0 | 0 | 2 |
| 1 | 0 | 4 |
| 2 | 1 | 8 |
| 3 | 1 | 10 |

The index column lists indexes corresponding to a time domain resource location notified by the DCI. Optionally, the index may be carried by a time domain resource assignment (Time domain resource assignment) field in the DCI. For example, the field includes two bits, where {00} corresponds to an index0, {01} corresponds to an index1, {10} corresponds to an index2, and {11} corresponds to an index3. The time interval KO is a time interval between a detected PDCCH and a PDSCH scheduled by the PDCCH, and is expressed in slots. The indication information RIV is indication information of a time domain start location and a length of the PDSCH within a slot. Each RIV value corresponds to a time domain location of a PDSCH within a slot.

The terminal device determines, based on the correspondence between the index and the time domain resource location, the time domain resource of the PDSCH.

The determining step may be performed by the processor 304 of the terminal device.

Step 605: The terminal device receives the system information on the physical resource carrying the system information.

The receiving step may be performed by the transceiver of the terminal device, or may be performed by the transceiver controlled by the processor of the terminal device.

According to the communication method implemented in steps 600 to 605, the type of the system information can be flexibly indicated without increasing the resource overheads, thereby improving communication efficiency.

In step 601, the network device sends the PDCCH carrying the downlink control information, and in step 603, the terminal device detects the PDCCH carrying the downlink control information, and the PDCCH carries the indication information, where the indication information is used to indicate the type of the system information. The PDCCH sent by the network device includes the CRC, and the CRC or the 16 low-order bits of the CRC are scrambled by the RNTI. The terminal device detects the PDCCH by using the RNTI. In the foregoing two steps, for a specific CRC algorithm, refer to the prior art. Details are not described herein, There may be a plurality of optional designs for the indication information that is used to indicate the type of the system information and that is in the foregoing two steps, and details are described in the following.

In an optional design, the indication information is a value of the RNTI, where the value of the RNTI is a first radio network temporary identifier RNTI, and the downlink control information is used to indicate first-type system information; and/or the value of the RNTI is a second radio network temporary identifier RNTI, and the downlink control information is used to indicate second-type system information. A correspondence between the value of the RNTI and the type of the system information may be predefined air preconfigured, for example, predefined by using a protocol or a standard, or is notified or configured by the network device to the terminal device in advance, and a specific notification or configuration time may be known by the terminal device when the terminal device performs PDCCH descrambling and decoding.

Specifically, the SI-RNTI used to indicate the system information may include an SI-RNTI0 and an SI-RNTI1. For example, a value of the SI-RNTI0 is FFFF, and/or a value of the SI-RNTI1 is another value that is not equal to FFFF, for example, FFF0. It should be noted herein that a specific RNTI value used to distinguish different system information types may be another value or in another form. This is not specifically limited herein.

In step 602, the network device determines, based on the type of the system information, the physical resource carrying the system information, and in step 604, the terminal device determines, based on the indication information, the physical resource carrying the system information. Herein, the network device and the terminal device may determine the physical resource by using a same or similar principle.

In step 603, the terminal device detects the physical downlink control channel PDCCH carrying the downlink control information. If descrambling succeeds by using the SI-RNTI0, for example, FFFF, the DCI instructs the terminal device to receive the first-type system information. If descrambling succeeds by using the SI-RINTI1, for example, another value other than FFFF, the DCI instructs the terminal device to receive the second-type system information.

In another optional design, the indication information is format indication information (Identifier for DCI formats), and the format indication information is carried in the downlink control information. In this optional design, the CRC of the PDCCH carrying the downlink control information is scrambled by a system information RNTI (SI-RNTI), to indicate receiving of the system information. Further, the format indication information is used to indicate the type of the system information.

Specifically, the format indication information may be indication information that is in the downlink control information and that is used to indicate a format. For example, a format of the downlink control information may be a DCI format 0_0 or a DCI format 1_0, the downlink control information in the two formats includes a format indication information bit, and the format indication information bit is used to indicate that the format of the downlink control information is the DCI format 0_0 or the DCI format 1_0. The DCI format 0_0 is used to schedule sending of an uplink PUSCH, and the DCI format 1_0 is used to schedule receiving of a downlink PDSCH.

In a specific implementation, different bit states or different bit values of the bits respectively indicate different system information types. For example, the format indication information occupies one bit. Further, "0" is used to indicate the RMSI, "1" is used to indicate the OSI; or "1" is used to indicate the RMSI, and "0" is used to indicate the OSI. For another example, the format indication information occupies a plurality of bits. Further, "01" is used to indicate the RMSI, another state is used to indicate the OSI, and the like.

It should be noted herein that the foregoing indication manner is merely used as example for description, and a specific indication manner is not limited herein.

Based on the foregoing description, it can be learned that a concept of the frequency domain reference point is introduced in NR, and a frequency domain reference point location needs to be considered during demodulation and receiving of the PDSCH, especially when different system information types correspond to different frequency domain reference points. Based on Embodiment 1, this embodiment of the application provides Embodiment 2. Based on the foregoing optional designs about configuration of the frequency domain reference point, a solution related to the frequency domain reference point is specifically provided. It should be noted herein that the solution in Embodiment 2 is based on Embodiment 1, and may refer to some related content or all content in Embodiment 1. Details are not described herein again.

Based on some or all of the implementations in Embodiment 1, the following several possible implementations are included in Embodiment 2.

In a possible implementation, different types of system information correspond to a same frequency domain reference point. To be specific, the frequency domain reference point is a predefined or preconfigured frequency domain reference point, for example, a start resource block of an initial active bandwidth part or a subcarrier numbered 0 in a start resource block of an initial active bandwidth part, for another example, a start resource block of a common index area or a subcarrier numbered 0 in a start resource block of a common index area. In this possible implementation, a terminal device and a network device do not need to consider a type of the system information, and perform PDSCH demodulation and receiving based on a predefined or preset frequency domain reference point.

In another possible implementation, different types of system information correspond to different frequency domain reference points. The frequency domain reference point corresponds to the type of the system information, a correspondence exists between the type of the system information and the frequency domain reference point, and no additional indication is required. FIG. 5 is used as an example, RN'ISI corresponds to a frequency domain reference point A (namely, a start resource block of an initial active BWP or a subcarrier numbered 0 in a start resource block of an initial active bandwidth part), and OSI corresponds to a frequency domain reference point B (namely, a start resource block of a common index area or a subcarrier numbered 0 in a start resource block of a common index area).

In this possible implementation, a location of a frequency domain reference point may be implicitly indicated by using the type of the system information, so that the type of the system information and the frequency domain reference point may be indicated without additional indication information, thereby improving communication efficiency and simplifying a system design.

In this possible implementation, a predefined or configured correspondence exists between the type of the system information and a frequency domain reference point location. For example, first-type system information corresponds to a first frequency domain reference point, and second-type system information corresponds to a second frequency domain reference point.

For example, a frequency domain reference point corresponding to the RMSI is the start resource block of the initial active BWP, and/or a frequency domain reference point corresponding to the OSI is the start resource block of the common index area.

Alternatively, a frequency domain reference point corresponding to the RMSI is the subcarrier numbered 0 in the start resource block of the initial active BWP, and a frequency domain reference point corresponding to another system information type OSI other than the RMSI is the subcarrier numbered 0 in the start resource block of the common index area. The start resource block of the common index area is indicated by indication information carried in the RMSI.

In this implementation, for step 602, when determining, based on the type of the system information, the frequency domain resource of the physical downlink shared channel PDSCH carrying the system information, the network device needs to obtain a DMRS sequence based on the type of the system information. Different information types correspond to different DMRS sequences. For details, refer to the foregoing description.

Further, because different system information types correspond to different frequency domain reference points, the network device determines a frequency domain location of the PDSCH. The network device modulates the DMRS sequence onto a physical resource, and sends the PDSCH carrying the system information.

For step 604, when the terminal device determines, based on the indication information, the frequency domain resource of the physical downlink shared channel PDSCH carrying the system information, the terminal device needs to obtain the frequency domain resource of the PDSCH based on the PDSCH frequency domain resource indication information included in the DCI and the frequency domain reference point corresponding to the type of the system information. Further, before demodulating the PDSCH, the terminal device needs to obtain the DMRS sequence based on the type of the system information or the frequency domain reference point, matches a received DMRS signal, and demodulates and/or decodes the PDSCH.

In yet another possible implementation, another indication information is used to indicate the frequency domain reference point corresponding to the system information.

In this possible implementation, the frequency domain reference point is separately indicated, thereby improving flexibility of downlink resource scheduling.

Optionally, different types of system information correspond to different frequency domain reference points, and the another indication information indicates a frequency domain reference point corresponding to the type of the system information delivered by the network device.

Optionally, frequency domain reference points do not completely correspond to types of the system information, and the another indication information indicates a frequency domain reference point corresponding to the system information delivered by the network device. In this optional solution, for system information of a same type, the frequency domain reference point may still be dynamically indicated by using the indication information, thereby improving flexibility of resource scheduling.

In an implementation, the another indication information may be an index of a control resource set (CORESET) on which a PDCCH is located. For example, if the index of the CORESET is 0, the frequency domain reference point is a reference point A. If the index of the CORESET is not 0, the frequency domain reference point is a reference point B. Specifically, the terminal device detects the PDCCH in a plurality of CORESETs. If the PDCCH is detected in a CORESET 0, a frequency domain reference point for receiving the PDSCH is the reference point A. If the PDCCH is detected in another CORESET, the frequency domain reference point for receiving the PDSCH is the reference point B.

In another implementation, the another indication information may be one of or a combination of the following included in the DCI: a hybrid automatic repeat request process number ((hybrid automatic repeat request, HARQ) process number), a new data indicator (New data indicator, NDI), or a redundancy version (Redundancy version, RV), Specifically, the terminal device detects, based on an SI-RNTI, the PDCCH carrying the DCI, and determines, based on the one of or a combination of the HARQ process number, the NDI or the RV that the frequency domain reference point is the reference point A or B.

For example, if an information bit in the NDI is {0}, the frequency domain reference point is the reference point A. If the information bit in the NDI is {1}, the frequency domain reference point is the reference point B.

In this possible implementation, for a specific interaction method, refer to the foregoing possible implementation. A difference between the two implementations lies only in different indication manners for the frequency domain reference point. For a specific interaction manner in this possible implementation, a person skilled in the art may perform proper adjustment based on the foregoing possible implementation and according to different indication manners.

The solutions provided in the embodiments of the application are mainly described above from a perspective of interaction between network elements. It can be understood that, to implement the foregoing functions, the network elements such as the network device and the terminal device include corresponding hardware structures and/or software modules for executing the functions. A person of ordinary skill in the art should easily be aware that, in combination with the example units and algorithms steps described in the embodiments disclosed in this specification, the application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the application.

The following provides a further description based on a possible structure of the terminal device in FIG. 3. The terminal device can perform any method in the embodiments of the application. The terminal device may include at least the transceiver 301 and the processor 304 (the processor is a general expression herein, and may represent a modem processor 304 or an integration of the modem processor 304 and the application processor 302). Optionally, the network device may further include other components in FIG. 3 and the description about FIG. 3, such as a memory. Herein, the transceiver 301 may include an independent receiver and an independent transmitter, to separately perform corresponding receiving and sending functions; or may be a transceiver that integrates the receiving and sending functions. No further limitation is imposed herein. The transceiver 301 in FIG. 3 may be structurally split into a receiver 301A and a transmitter 301B. The terminal device is used only as an optional entity for an example description herein. The following provides a description by using a wireless apparatus as an entity: The wireless apparatus may be a unit, a chip, or a component included in the terminal device, or may be the terminal device.

For Embodiment 1 and Embodiment 2 of the application:

The wireless apparatus includes a processor 304 and a receiver 301A, where the processor 304 is configured to detect a physical downlink control channel PDCCH carrying downlink control information, the PDCCH carries indication information, and the indication information is used to indicate a type of system information;

the processor 304 is configured to determine, based on the indication information, a physical resource carrying the system information; and the receiver 301A is configured to receive the system information on the physical resource.

Specifically, a cyclic redundancy code CRC included in the PDCCH is scrambled by a radio network temporary identifier RNTI.

In an optional design, the indication information is a value of the RNTI, where the value of the RNTI is a first radio network temporary identifier RNTI, and the downlink control information is used to indicate first-type system information; and/or the value of the RNTI is a second radio network temporary identifier RNTI, and the downlink control information is used to indicate second-type system information.

In an optional design, the indication information is format indication information, and the format indication information is carried in the downlink control information.

In an optional design, the processor is configured to obtain, based on a frequency domain reference point, a demodulation reference signal WARS corresponding to the physical resource carrying the system information; and the frequency domain reference point corresponds to the type of the system information.

Further, a correspondence between the frequency domain reference point and the type of the system information is preconfigured or predefined. Alternatively, the frequency domain reference point is indicated by using second indication information.

A time domain resource and/or frequency domain resource of the PDCCH is indicated by using information carried in a synchronization/broadcast channel block.

It should be noted that, for a specific implementation of a communication method performed by the wireless apparatus, refer to the description of the communication method provided in the embodiments of the application. The terminal device in this embodiment of the application and the communication method corresponding to FIG. 6 are based on a same concept, and technical effects brought by the terminal device are the same as those of the communication method. Specific functions of the processor and the receiver included in the wireless apparatus in this embodiment of the application and any features, terms, and implementation details that are related to the specific functions are corresponding to the functions of the terminal device in the method embodiment corresponding to FIG. 6. For specific content, refer to the description of the method embodiment corresponding to FIG. 6 in the application. Details are not described herein again.

It should be noted that, all or some of the foregoing embodiments may be implemented by the wireless apparatus by using software, hardware, firmware, or any combination thereof.

Figure 7:
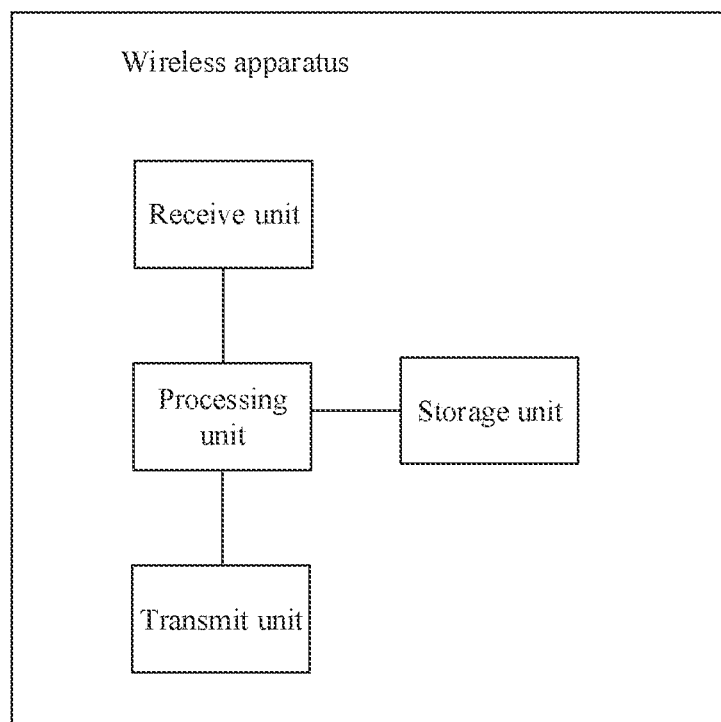
FIG. 7 is a possible schematic structural diagram of a wireless apparatus according to an embodiment of the application.

For a structure of the wireless apparatus, in another optional manner, corresponding component in the foregoing embodiment may be implemented by corresponding hardware, or may be implemented by corresponding hardware by executing corresponding software. For example, the foregoing receiver 301A may be hardware that has the foregoing receiving function, for example, a transceiver that integrates receiving and sending functions or a receiver that only implements a receiving function, or may be a general processor or another hardware device that can execute a corresponding computer program to implement the foregoing function, or may be a software module or a functional unit that executes a corresponding function, for example, a receive unit. For another example, the foregoing processor 304 may be hardware that has a function of executing the processor, for example, a processor with a specific function, or a general processor, or may be another hardware device that can execute a corresponding computer program to complete the foregoing function, or may be a software module or a functional unit that executes a corresponding function, for example, a processing unit. For yet another example, the transmitter 301B may be hardware that has the foregoing sending function, for example, a transceiver that integrates receiving and sending functions, or a transmitter that only implements a transmit function, or may be a general processor or another hardware device that can execute a corresponding computer program to implement the foregoing function, or may be a software module or a functional unit that executes a corresponding function, for example, a transmit unit. Optionally, the wireless apparatus may further include a storage unit. For details, refer to FIG. 7.

The following further describes a possible structure of the network device in FIG. 2. The network device can perform any method in the embodiments of the application. The network device may include at least the controller or processor 201 (the processor 201 is used as an example for description in the following) and the transceiver 202. Optionally, the network device may further include other components in FIG. 2 and in the description about FIG. 2, such as a memory. The transceiver 202 herein may include an independent receiver and transmitter, and respectively perform corresponding receiving and sending functions, or may be a transceiver that integrates receiving and sending functions. No further limitation is imposed herein. The transceiver 202 in FIG. 2 may be structurally split into a receiver 202A and a transmitter 202B. The network device is used only as an optional entity for an example description herein. The following provides a description by using a wireless apparatus as an entity. The wireless apparatus may be a unit, a chip, or a component included by the network device, or may be the network device.

For Embodiment 1 and 2 of the application:

The wireless apparatus includes the processor 201 and the transmitter 202B, where the transmitter 202B is configured to send a physical downlink control channel PDCCH carrying downlink control information, the PDCCH carries indication information, and the indication information is used to indicate a type of system information; and the processor 201 is configured to determine, based on the type of the system information, a physical resource carrying the system information.

Specifically, the PDCCH includes a cyclic redundancy code CRC. The processor is configured to scramble the CRC by using a radio network temporary identifier RNTI.

In an optional design, the indication information is a value of the RNTI, where the value of the RNTI is a first radio network temporary identifier RNTI, and the downlink control information is used to indicate first-type system information; and/or the value of the RNTI is a second radio network temporary identifier RNTI, and the downlink control information is used to indicate second-type system information.

In an optional design, the indication information is format indication information, and the format indication information is carried in the downlink control information.

In an optional design, the transmitter 202B is configured to send a demodulation reference signal DMRS of the physical resource carrying the system information. The DMRS corresponds to a frequency domain reference point, and the frequency domain reference point corresponds to the type of the system information.

In this optional design, a correspondence between the frequency domain reference point and the type of the system information is preconfigured or predefined. Alternatively, the transmitter 202B is configured to send second indication information, and the second indication information is used to indicate the frequency domain reference point corresponding to the type of the system information.

A time domain resource and/or frequency domain resource of the PDCCH is indicated by using information carried in a synchronization/broadcast channel block.

It should be noted that, for a specific implementation of a communication method performed by the wireless apparatus, refer to the description of the communication method provided in the embodiments of the application. The network device in this embodiment of the application and the communication method corresponding to FIG. 6 are based on a same concept, and technical effects brought by the network device are the same as the foregoing control resource obtaining method. Specific functions of the processor and the receiver included in the wireless apparatus in this embodiment of the application and any features, terms, and implementation details that are related to the specific functions are corresponding to the functions of the network device in the method embodiment corresponding to FIG. 6. For specific content, refer to the description of the method embodiment corresponding to FIG. 6 in the application. Details are not described herein again.

It should be noted that, all or some of the foregoing embodiments may be implemented by the wireless apparatus by using software, hardware, firmware, or any combination thereof.

For a structure of the wireless apparatus, in another optional manner, corresponding component in the foregoing embodiment may be implemented by corresponding hardware, or may be implemented by corresponding hardware by executing corresponding software. For example, the foregoing transmitter 202B may be hardware that has the foregoing sending function, for example, a transceiver that integrates receiving and sending functions or a transmitter that only implements a sending function, or may be a general processor or another hardware device that can execute a corresponding computer program to implement the foregoing function, or may be further a software module or a functional unit that executes a corresponding function, for example, a transmit unit. For another example, the foregoing processor 201 may be hardware that has a function of executing the processor, for example, a processor with a specific function, or a general processor, or may be another hardware device that can execute a corresponding computer program to complete the foregoing function, or may be further a software module or a functional unit that executes a corresponding function, for example, a processing unit. For another example, the receiver 202A may be hardware that has the foregoing sending function, for example, a transceiver that integrates receiving and sending functions, or a receiver that only implements a receiving function, or may be a general processor or another hardware device that can execute a corresponding computer program to implement the foregoing function, or may be further a software module or a functional unit that executes a corresponding function, for example, a receive unit. Optionally, the wireless apparatus may further include a storage unit. For details, refer to FIG. 7.

It can be understood that, the accompanying drawings show only a simplified design of the wireless apparatus. In an actual application, the wireless apparatus may include any quantities of transmitters, receivers, processors, controllers, memories, communications units, and the like.

An embodiment of the application further provides a communications system, including at least one network device and at least one terminal device described for executing the embodiments of the application.

An embodiment of the application further provides an apparatus (for example, an integrated circuit, a wireless device, and a circuit module), configured to implement the foregoing communication method. An apparatus for implementing a power tracker and/or a power generator described in this specification may be a standalone device or may be a part of a larger device. The device may be: (i) an independent IC, (ii) a set of one or more ICs, where the set may include a memory IC for storing data and/or instructions, (iii) an RFIC, such as an RF receiver or an RF transmitter/receiver, (iv) an ASIC, such as a mobile station modem, (v) a module that can be embedded in another device, (vi) a receiver, a cellular phone, a wireless device, or a mobile unit, or (vii) others.

The method and the apparatus provided in the embodiments of the application may be applied to a terminal device or a network device (may be collectively referred to as a wireless device). The terminal device or the network device or the wireless device may include a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing by using a process (process), such as the Linux operating system, the UNIX operating system, the Android operating system, the iOS operating system, or the Windows operating system. The application layer includes applications such as a browser, an address book, word processing software, and instant messaging software. In addition, a specific structure of a method execution entity is not limited in the embodiments of the application, provided that the method execution entity can perform communication based on the signal transmission method in the embodiments of the application by running a program that records code of the method in the embodiments of the application. For example, the wireless communication method in the embodiments of the application may be performed by the terminal device, or the network device, or a function module that is in the terminal device or the network device and that can call and execute a program.

In the several embodiments provided in this application, it should be understood that the disclosed system, apparatus, and method may be implemented in other manners. For example, the described apparatus embodiments are merely examples. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

When the functions are implemented in a form of a software functional unit and sold or used as an independent product, the functions may be stored in a computer readable storage medium. Based on such an understanding, the technical solutions in the embodiments of the application, or the part contributing to the prior art, or some of the technical solutions may be implemented in the form of a software product. The computer software product is stored in a storage medium, and includes several instructions for instructing a computer device (which may be a personal computer, a server, a network device, or the like) to perform all or some of steps of the method described in the embodiments of the application. The storage medium includes various media that can store program code, such as a USB flash drive, a removable hard disk, a read-only memory (ROM, Read-Only Memory), a random access memory (RAM, Random Access Memory), a magnetic disk, or an optical disc.

The descriptions are only specific implementations of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A method, comprising:
sending, by a network device, a physical downlink control channel (PDCCH) carrying downlink control information (DCI), wherein the DCI comprises indication information, and the indication information indicates that a type of system information is either system information type1 (SIB1) or a system information (SI) message other than SIB1; and
sending, by the network device, the system information and a demodulation reference signal (DMRS) of the system information, wherein a frequency domain reference point of the DMRS is one of at least two frequency domain reference points that are used to determine DMRSs for the SIB1 and the SI message, and the frequency domain reference point used to determine the DMRS of the SIB1 and the frequency domain reference point used to determine the DMRS of the SI message are different.

2. The method according to claim 1, wherein
a cyclic redundancy code (CRC) comprised in the DCI is scrambled by a system information-radio network temporary identifier (SI-RNTI).

3. The method according to claim 1, wherein
the indication information is format indication information.

4. The method according to claim 1, wherein
the indication information is a radio network temporary identifier (RNTI), wherein
when the RNTI is a first RNTI, the downlink control information indicates that the type of the system information is SIB1; or
when the RNTI is a second RNTI, the downlink control information indicates the type of the system information is SI message.

5. The method according to claim 1, wherein
the indication information is one bit carried in the DCI.

6. The method according to claim 5, wherein
when the one bit is a first value, the downlink control information indicates that the type of the system information is SIB1; or
when the one bit is a second value, the downlink control information indicates the type of the system information is SI message.

7. The method according to claim 1, wherein
a preconfigured or predefined correspondence exists between the at least two frequency domain reference points and types of the system information; or
the frequency domain reference point of the DMRS is indicated by second indication information.

8. The method according to claim 1, wherein
at least one of a time domain resource or frequency domain resource of the PDCCH is indicated by information carried in a synchronization/broadcast channel block.

9. An apparatus, comprising at least one processor and a memory, where the memory stores a computer program for execution by the at least one processor, wherein the computer program, when executed, cause the apparatus to perform operations comprising:
sending, a physical downlink control channel (PDCCH) carrying downlink control information (DCI), wherein the DCI comprises indication information, and the indication information indicates that a type of system information is either system information type1 (SIB1) or a system information (SI) message other than SIB1; and
sending, the system information and a demodulation reference signal (DMRS) of the system information, wherein a frequency domain reference point of the DMRS is one of at least two frequency domain reference points that are used to determine DMRSs for the SIB1 and the SI message, and the frequency domain reference point used to determine the DMRS of the SIB1 and the frequency domain reference point used to determine the DMRS of the SI message are different.

10. The apparatus according to claim 9, wherein
a cyclic redundancy code (CRC) comprised in the DCI is scrambled by a system information-radio network temporary identifier (SI-RNTI).

11. The apparatus according to claim 9, wherein
the indication information is format indication information.

12. The apparatus according to claim 9, wherein
the indication information is a radio network temporary identifier (RNTI), wherein
when the RNTI is a first RNTI, the downlink control information indicates that the type of the system information is SIB1; or
when the RNTI is a second RNTI, the downlink control information indicates the type of the system information is SI message.

13. The apparatus according to claim 9, wherein
the indication information is one bit carried in the DCI.

14. The apparatus according to claim 13, wherein
when the one bit is a first value, the downlink control information indicates that the type of the system information is SIB1; or
when the one bit is a second value, the downlink control information indicates the type of the system information is SI message.

15. The apparatus according to claim 9, wherein
a preconfigured or predefined correspondence exists between the at least two frequency domain reference points and types of the system information; or
the frequency domain reference point of the DMRS is indicated by second indication information.

16. The apparatus according to claim 9, wherein
at least one of a time domain resource or frequency domain resource of the PDCCH is indicated by information carried in a synchronization/broadcast channel block.

17. A non-transitory storage medium, configure to store program instructions; wherein, when executed by a computer, the instructions cause the computer to perform:
sending, a physical downlink control channel (PDCCH) carrying downlink control information (DCI), wherein the DCI comprises indication information, and the indication information indicates that a type of system information is either system information type1 (SIB1) or a system information (SI) message other than SIB1; and sending, the system information and a demodulation reference signal (DMRS) of the system information, wherein a frequency domain reference point of the DMRS is one of at least two frequency domain reference points that are used to determine DMRSs for the SIB1 and the SI message, and the frequency domain reference point used to determine the DMRS of the SIB1 and the frequency domain reference point used to determine the DMRS of the SI message are different.

18. The non-transitory storage medium according to claim 17, wherein
a cyclic redundancy code (CRC) comprised in the DCI is scrambled by a system information-radio network temporary identifier (SI-RNTI).

19. The non-transitory storage medium according to claim 17, wherein
the indication information is format indication information.

20. The non-transitory storage medium according to claim 17, wherein
the indication information is a radio network temporary identifier (RNTI), wherein
when the RNTI is a first RNTI, the downlink control information indicates that the type of the system information is SIB1; or
when the RNTI is a second RNTI, the downlink control information indicates the type of the system information is SI message.

21. The non-transitory storage medium according to claim 17, wherein
the indication information is one bit carried in the DCI.

22. The non-transitory storage medium according to claim 21, wherein
when the one bit is a first value, the downlink control information indicates that the type of the system information is SIB1; or
when the one bit is a second value, the downlink control information indicates the type of the system information is SI message.

23. The non-transitory storage medium according to claim 19, wherein
a preconfigured or predefined correspondence exists between the at least two frequency domain reference points and types of the system information; or
the frequency domain reference point of the DMRS is indicated by second indication information.

24. The non-transitory storage medium according to claim 17, wherein
at least one of a time domain resource or frequency domain resource of the PDCCH is indicated by information carried in a synchronization/broadcast channel block.

* * * * *